US00H002291H

(19) United States
(12) Statutory Invention Registration
Kretschmer et al.

(10) Reg. No.: US H2291 H
(43) Published: May 6, 2014

(54) POLYESTER POLYMERIZATION PROCESS

(75) Inventors: Stephan Kretschmer, Stadtbergen (DE); Bryan Moore, Spartanburg, SC (US); Gordon Shaw, Charlotte, NC (US); Miguel A. Osornio, Spartanburg, SC (US)

(73) Assignee: INVISTA North America S.ar.l., Wilmington, DE (US)

(21) Appl. No.: 13/246,370

(22) Filed: Sep. 27, 2011

(65) Prior Publication Data

US 2013/0243984 A1 Sep. 19, 2013

(51) Int. Cl.
*C08G 63/85* (2006.01)

(52) U.S. Cl.
USPC ..... 428/35.7; 528/279; 523/307

(58) Field of Classification Search
USPC ..... 428/35.7; 528/279; 523/307
See application file for complete search history.

(56) References Cited

U.S. PATENT DOCUMENTS

| | | | | |
|---|---|---|---|---|
| 2012/0121911 | A1* | 5/2012 | Mullen et al. | 428/412 |
| 2012/0214935 | A1* | 8/2012 | Roodvoets et al. | 524/539 |
| 2013/0243984 | A1* | 9/2013 | Kretschmer et al. | 428/35.7 |

* cited by examiner

*Primary Examiner* — Daniel Pihulic
(74) *Attorney, Agent, or Firm* — INVISTA North America S.ar.l.

(57) ABSTRACT

The present invention relates to a process for producing PET based on titanium catalyst having acceptable properties for resin used in the production of bottles for beverages. More particularly the invention relates to a process in which the incoming pre-polymer temperature is higher than the final outlet temperature in the final melt phase polycondensation reactor.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYESTER POLYMERIZATION PROCESS

FIELD OF INVENTION

The present invention relates to a process for producing PET based on titanium catalyst having acceptable properties for resin used in the production of bottles for beverages. More particularly the invention relates to a process which allows for significantly lower capital cost and/or lower operating cost by introducing a higher incoming pre-polymer temperature as compared to the final melt temperature in the final melt phase polycondensation reactor.

BACKGROUND OF INVENTION

Polyethylene terephthalate and its copolyesters ("PET") are used extensively in packaging applications, in particular as beverage containers. The conventional PET production process begins with esterification of predominantly terephthalic acid and ethylene glycol, or ester exchange of predominantly dimethyl terephthalate and ethylene glycol at a temperature of about 265° C. The esterification need not be catalyzed. Typical ester exchange catalysts, which may be used separately or in combination, include, zinc, manganese or magnesium acetates, titanium alkoxides, tin esters and/or other such catalyst materials that are well known to those skilled in the art. The resulting mixture, average degree of polymerization (DP) of less than 20, is then subjected to polycondensation in the melt at elevated temperature, for example about 285° C. and above, in the presence of a suitable catalyst until it reaches the desired molecular weight, or Intrinsic Viscosity (IV). Compounds of Sb, Sn, Ge and others have been used as polycondensation catalysts.

There is a trend in the industry to move from the conventional medium activity polycondensation catalysts, such as antimony compounds used at amounts of over 250 ppm Sb, to more active catalysts such as titanium compounds that can be used a much lower amounts, e.g. 5 to 15 ppm Ti. However these more active compounds increase the degradation of the polyester which leads to more by-products such as acetaldehyde (AA) and their precursors. Whether this resin, quenched and cut into pellets, is used directly from the melt polymerization process, or after a solid state polymerization process, when processed into extrusion blown, or injection stretch blown bottles, the level of AA is unacceptably high and influences the taste of the liquid in the bottle.

This problem can be overcome by reducing the polycondensation temperatures, but this also requires that the esterification temperatures also be reduced. This therefore reduces the capacity of the continuous polymerization lines.

The problem of controlling the presence of free AA and AA precursors produced in the melt-phase manufacture was discussed in U.S. Pat. No. 6,559,271 B2. This patent proposes that the amount of free AA and AA precursors can be limited by keeping the reaction temperature during the entire polycondensation step below 280° C. by using a low dosage of a highly active titanium catalyst to limit the residence time of the polymer in the melt-phase manufacture. The addition of an AA inhibitor, or by adding an AA bonding substance, reduces the AA to an acceptable level. One remaining problem associated with this approach is that the process described is necessarily costly with long residence times in esterification to maintain the proscribed temperatures.

There is therefore a need for a process that maintains the standard esterification temperature and throughput, but reduces the temperature used for the polycondensation step for highly active catalysts.

SUMMARY OF INVENTION

The invention relates to a method for the production of solid polyester polymer resin comprising:

a. esterifying the diacids and diols to form an oligomer mixture with a DP of less than 20; and
b. polycondensing the oligomer mixture in the presence of a polycondensation catalyst composition comprising titanium species at a temperature of greater than 284° C. to an IV of about 0.4 dl/g; and
c. completing the polycondensation by increasing the IV by at least 0.2 dl/g and cooling the polymer melt temperature to less than 282° C.; and
d. solidifying and cutting the molten polyester polymer composition into solid polyester polymer particles; and optionally
e. solid state polymerizing the solid polyester polymer particles to increase the IV by more than 0.05 dl/g.

In an alternative process the ester of the diacids is transesterified with the diols, in the presence of a catalyst, to form the oligomer mixture of step a).

DETAILED DESCRIPTION OF INVENTION

The polyester can be selected from polyethylene terephthalate, polyethylene naphthalate, polyethylene terephthalate-co-isophthalate, polyethylene naphthalate-co-isophthalate, polyethylene-co-cyclohexane dimethylene terephthalate and mixtures thereof. The polyester can be a copolymer of polyethylene terephthalate having a comonomer content of less than 10 mole % of the polyester.

Polyethylene terephthalate (PET) is conventionally made by reacting either dimethyl terephthalate or terephthalic acid (TA) with ethylene glycol (EG), for example, via an esterification reaction, followed by a polycondensation reaction. When making PET the reactions can be driven to near completion, yielding PET having up to 3 weight percent of diethylene glycol and other byproducts. PET is meant to include small amounts of byproducts.

Conventional continuous production of PET comprises reacting terephthalic acid and ethylene glycol at a temperature of approximately 200° to 250° C. forming monomer and water. Because the reaction is reversible, the water is continuously removed, driving the reaction to the production of monomers and some oligomers. Next the monomers and oligomers undergo polycondensation reaction in vacuum conditions at a temperature of about 250° to 290° C. to form polyester having an IV of about 0.4 to 0.6 dl/g. During the esterification reaction, no catalyst is needed. However, in the polycondensation reaction, a catalyst such as an antimony, germanium, titanium or aluminum compound, optionally with a co-catalyst is necessary.

PET is also made in batch and continuous processes from the reaction of the ester-dimethyl terephthalate and ethylene glycol, at a reaction temperature of approximately 190° to 230° C. forming alcohol (methanol) and monomer. This esterification reaction is reversible and the alcohol must be continuously removed, driving the reaction to the production of monomer and some oligomer. In the reaction of dimethyl terephthalate and ethylene glycol, catalysts such as manganese, zinc, cobalt or other conventional catalyst are employed. Next, the monomer and oligomer undergo a polycondensation reaction at the conditions stated above to form polyester or copolyester having an IV of about 0.4 to 0.6 dl/g if the copolyester is to be solid state polymerized by conventional methods to a higher IV. Making a copolyester of PET and a dicarboxylic acid (to reduce the crystallization rate and improve its barrier properties) merely requires the addition of the acid or its ester equivalent, for example, to also undergo an esterification (or transesterification) reaction. Making a copolyester of PET and a diol merely requires the addition of the diol during esterification (or transesterification).

Resins containing up to 20 wt % of the dicarboxylic acid are useful in forming bottles or jar containers. Suitable diacids can be aliphatic, alicyclic, or aromatic dicarboxylic acids such as isophthalic acid, 1,4-cyclohexanedicarboxylic acid; 1,3-cyclohexanedicarboxylic acid, succinic acid, glutaric acid, adipic acid, sebacic acid, 1,12-dodecanedioic acid; 2,6-naphthalenedicarboxylic acid, bibenzoic acid, oxalic acid, malonic acid, pimelic acid, suberic acid, azelaic acid, maleic acid, fumaric acid, phthalic acid, hemimellitic acid, trimellitic acid, trimesic acid, or mixtures of these and their equivalents. It is often suitable to use a functional acid derivative equivalent such as dimethyl, diethyl, or dipropyl ester of the dicarboxylic acid. Bottle resin, including the present invention, typically contains 1.5 to 2.5 wt. %, based on the weight of the resin, of isophthalic acid as the crystallization retarder additive.

Alternatively, polyester resins can optionally be modified by up to 20 wt % of one or more different diols than ethylene glycol. Such additional diols include cycloaliphatic diols for example having 6 to 20 carbon atoms or aliphatic diols preferably having 3 to 20 carbon atoms. Examples of such diols to be included with ethylene glycol are: diethylene glycol, triethylene glycol, 1,2-cyclohexanedimethanol, 1,3-cyclohexanedimethanol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4 hydroxypropoxyphenyl)-propane.

Another embodiment of the present invention is a modified polyester made by reacting at least 85mol- % terephthalate from either terephthalic acid or dimethyl-terephthalate with any of the above comonomers.

In addition to polyester made from terephthalic acid (or dimethyl terephthalate) and ethylene glycol, or a modified polyester as stated above, the present invention also includes the use of 100% of an aromatic diacid such as 2, 6-naphthalene dicarboxylic acid or bibenzoic acid, or their diesters, and a modified polyester made by reacting at least 85 mol- % of the dicarboxylate from these aromatic diacids/diesters with any of the above comonomers.

When more active catalysts such as titanium compounds are used the degradation of the polyester is increased over the rate found with Sb compounds, which leads to more by-products such as acetaldehyde (AA) and their precursors. Whether this resin, quenched and cut into pellets, is used directly from the melt polymerization process, or after a solid state polymerization process, when processed into extrusion blown, or injection stretch blown bottles, the level of AA is unacceptably high and influences the taste of the liquid in the bottle.

For any melt phase process it is desirable to reduce the residence time of the process in order to reduce the initial capital cost required to install the equipment. Therefore typically the process is operated at the highest possible temperature. For example by operating the esterification process at 288° C. compared to 265° C. reduces the required residence time by a factor of three to one hour from three. Therefore high temperature operation is preferred in esterification. However with the use of titanium catalyst to facilitate polycondensation it is necessary to process at low temperatures. The temperatures required for polycondensation with titanium catalyst are less than what is optimum for esterification. This is not the case when other less active catalysts are used such as antimony trioxide or antimony triacetate.

Similarly it is of economic interest to operate esterification with a low feed mole ratio of ethylene glycol to terephthalic acid to reduce operating cost associated with removing the excess glycol. An amount of ethylene glycol fed to esterification above that which is required for the final PET molecule is necessarily removed through vaporization which is an energy intensive process. Higher temperature esterification processes tend to reach conversion quicker therefore require less excess ethylene glycol. The preferred process has a TA/EG mole ratio less than about 1.15. Therefore it is important to preserve the use of high temperature esterification with the use of titanium catalyst.

The esterification reaction is continued until an acid or ester group conversion of, for example, at least 80% is achieved, but more typically until an acid or ester group conversion of at least 90% is achieved to make the desired oligomeric mixture. Typical ester exchange catalysts which may additionally be used in an ester exchange reaction between a dialkylterephthalate and a diol may be, for example, zinc compounds such zinc acetate, or manganese compounds such as manganese acetates and/or other such catalyst compounds, each used singly or in combination with each other. Any other catalyst materials well known to those skilled in the art are suitable. In one aspect, the ester exchange reaction proceeds in the presence of titanium compounds.

The resulting oligomeric mixture formed in the esterification zone (which includes direct esterification and ester exchange processes) has an average degree of polymerization of less than 40, corresponding to an IV of less than 0.3 dl/g.

Once the oligomeric mixture is made to the desired percent conversion of the acid or ester groups, it is transported from the esterification zone or reactors to the polycondensation zone. The commencement of the polycondensation reaction is generally marked by a reduction in pressure to near total vacuum compared to the esterification zone. Typical polycondensation reactions occur at temperatures ranging from about 260° C. and 300° C., and at sub-atmospheric pressure of between about 8 mbar to 0.3 mbar. The residence time of the reactants typically ranges from between about 1 to about 3 hours. In the polycondensation reaction, a significant amount of glycols are evolved by the condensation of the oligomeric ester species and during the course of molecular weight build up.

The polycondensation zone is typically comprised of a prepolymer zone and a finishing zone. Polycondensation reactions are initiated and continued in the melt phase in a prepolymerization zone and finished in the melt phase in a finishing zone, after which the melt is solidified to form the polyester polymer melt phase product, generally in the form of chips, pellets, or any other shape.

Each zone may comprise a series of one or more distinct reaction vessels operating at different conditions or the zones may be combined into one reaction vessel using one or more sub-stages operating at different conditions in a single reactor.

This invention teaches that through the judicious choice of the process heat transfer medium the temperature profile can actually progress from high to low temperature through cooling. Generally, each of the prepolymerization and the finishing zones comprise one or a series of more than one reaction vessel, and the prepolymerization and finishing reactors are sequenced in a series as part of a continuous process for the manufacture of the polyester polymer.

The catalyst composition comprising Ti species may be added in the esterification or polycondensation zones, such as immediately prior to initiating polycondensation, during polycondensation, or to the esterification zone prior to initiating esterification or ester exchange or during or upon completion of the esterification or ester exchange reaction. If the titanium containing catalyst is added to the esterification zone, it is typically blended with the diol(s) and fed into an esterification reactor(s) and/or into a paste tank containing a paste of terephthalic acid and glycol that is fed into the first esterification reactor. In a typical DMT-based process, those skilled in the art recognize that other catalyst material and points of adding the catalyst material and other ingredients such as phosphorus compounds vary from a typical direct esterification process.

In another aspect, a titanium compound is added to the oligomer mixture upon or after completion of esterification or to a polyester melt, for example, no later than when the IV of the melt reaches about 0.3 dl/g, or no later than when the IV of the melt reaches about 0.2 dl/g, or no later than when the IV of the melt reaches about 0.1 dl/g, or to the oligomer mixture exiting the esterification zone, or prior to commencing or at the start of polycondensation.

Titanium catalysts include, in general, titanium (IV) compounds such as alkoxides, glycolates, acetates, oxalates, etc. Alkoxides and mixed glycolate alkoxides are especially suitable. Titanium alkoxides include, for example, acetyl tri-isopropyl titanate, tetra-isopropyl titanate and tetra-isobutyl titanate. Especially suitable titanium catalytic materials include acetyl tri-isopropyl titanate and tetra-isopropyl titanate (titanium (IV) isopropoxide). Solid titanium compounds which serve as heterogeneous catalysts are also suitable, including those disclosed in U.S. Pat. No. 5,656,716, incorporated herein by reference. Titanium oxides and hydrated oxides may become solubilized during the course of the polymerization, for example by complexation and/or reaction with the glycol component. The titanium catalysts may be introduced into the reaction in any convenient manner. A solution of the catalyst in alcohol or a slurry of the catalyst in ethylene glycol may be used, for example, as may be a solution or slurry of the catalyst in an oligomer mixture. The catalyst may also be added alone, and distributed by agitation (i.e., by mechanical mixing or by use of a static mixer.)

Measured titanium levels in the polyester are reported as the amount of Ti atoms in ppm based on the weight of the polyester polymer, and not in terms of levels of the titanium compounds added. In one aspect, the amount of titanium catalyst added may be, for example, at least in the range of about 2 to about 50 ppm, preferably in the range of about 3 to about 20 ppm, and most preferable in the range of about 5 to about 15 ppm.

The polycondensation stage generally employs a series of one or more vessels and is operated at a temperature of between about 260° C. and 305° C. for a period between about thirty minutes to four hours. During this stage, the IV of the monomers and oligomers are increased generally up to about no more than 0.75 dl/g. The diol byproduct is removed from the polymer melt generally using an applied vacuum ranging from about 0.6 to 40 mbar to drive the polycondensation of the melt. In this regard, the polymer melt is sometimes agitated to promote the escape of the diol from the polymer melt. As the polymer melt is fed into successive vessels, the molecular weight and thus the melt viscosity, which is related to the intrinsic viscosity, of the polymer melt increases. The pressure of each vessel is generally decreased to allow for a greater degree of polymerization in each successive vessel or in each successive zone within a vessel.

In one aspect, the temperature applied to the polymer melt or of the polymer melt in at least a portion of the polycondensation zone is, for example, greater than about 284 deg and up to about 290° C. In another aspect, the temperatures in the finishing zone are, contrary to conventional practice, lower than about 280° C. in order to avoid rapid increases in the rate of AA precursor formation. The pressure in the finishing zone may be within the range of, for example, about 0.3 to about 30 mbar, or about 0.3 to about 10 mbar, or about 0.2 to about 2 mbar.

A necessary step of this invention is to reduce the temperature in the polycondensation zone from the inlet to the outlet. This can be accomplished by cooling the monomer prior to the inlet or by cooling the reactor vessels themselves. In one specific embodiment of the invention the reactors are liquid cooled to facilitate the decrease in temperature required to produce a product of acceptable quality. Suitable reactors are described in U.S. Pat. No. 5,599,509, incorporated herein by reference.

Once the polymer molecular weight is built to the desired degree, the molten polyester polymer in the melt phase reactors is discharged as a melt phase product and solidified and cut into pellets. The pellets can be solid phase polymerized to increase the IV to a higher value, e.g. by more than 0.05 dl/g.

By utilizing the titanium catalyzed process of the present invention, polymers with suitably high IV may be obtained in relatively short overall process times or in similar process times but at milder temperatures, and produce polyester product which contain the same or less AA amount and generate the same or less AA during future processing than a polyester using conventional Sb catalysts.

In addition, certain agents which colorize the polymer may be added to the melt. In one aspect, a bluing toner is added to the melt in order to reduce the yellowness of the resulting polyester polymer melt phase product. In addition, red toners can also be used to adjust the green-red hue.

The total amount of toner components added depends on the amount of inherent yellow color in the base polyester and the efficacy of the toner. Generally, a concentration of up to about 15 ppm of combined organic toner components and a minimum concentration of about 0.5 ppm are used.

The polyester polymers of the invention and bottle preforms made from these polymers may contain a reheat additive. Reheat additives added in the inventive polyester polymers include, for example activated carbon, carbon black, graphite, fine antimony, tin or copper metal, black iron oxide, titanium nitride and the like.

The specific reheat additive, as well as other additives (e.g., polymers such as polycarbonate and PCR), incorporated into the base polyester polymer of the invention may have a strong influence on the color of the polyester polymers and products formed these inventive polyester polymers. To correct for this color shift, an adjustment in the amount of colorant(s) (also called "toner" herein) may be required to produce a polyester polymers and corresponding products to meet the requirements of the end use application.

Other components can be added to the composition of the present invention to enhance the performance properties of the polyester polymer. For example, crystallization aids, impact modifiers, surface lubricants, denesting agents, antioxidants, ultraviolet light absorbing agents, colorants, nucleating agents, other reheat rate enhancing aids, sticky bottle additives such as talc, and fillers and the like can be included.

Test Methods

The Intrinsic Viscosity (IV) values described throughout this description are set forth in dl/g units as calculated from the inherent viscosity measured at 30° C. in 60% phenol and 40% 1,1,2,2-tetrachloroethane by weight using the Standard Method described in ASTM D 4603-03.

The acetaldehyde level was measured according to ASTM F 2013-00, and reported as ppm based on the weight of the polyester resin.

X-ray fluorescence (XRF) is the analytical technique used to report catalyst levels in polymers of the invention.

EXAMPLES

Inventive Example 1

A continuous polymerization pilot line, operating at 28.5 kg/hour, consisting of primary (PE) and secondary esterification (SE) vessels, a pre-polymer vessel (LP) followed by an intermediate polymerizer (IP) and a high polymerizer (HP) was used for this example. The intermediate and high polymerization vessels were cooled by a liquid heating medium. The polymer exiting the HP was extruded into strands, quenched in water and cut into pellets.

For this example, the intermediate and high polymerizers were cooled such that the polymer entering the intermediate polymerizer was at a temperature of 288° C., and leaving the high polymerizer was 280° C. The process conditions and polymer properties are set forth in Table 1.

Comparative Example 2

For this example the polymer entering the intermediate polymerizer was at a temperature of 288° C. and, by adjusting the temperature of the heating medium, leaving the high polymerizer the polymer temperature was also at 288° C. The process conditions and polymer properties are set forth in Table 1.

TABLE 1

| | Inventive Example 1 | Comparative Example 2 |
|---|---|---|
| TA/EG mol ratio | 1.14 | |
| Ti, ppm | 7 | |
| PE temperature, ° C. | 288 | |
| SE temperature, ° C. | 288 | |
| LP temperature, ° C. | 288 | |
| IP inlet Temperature, ° C. | 288 | |
| IP outlet temperature, ° C. | 283 | 288 |
| HP outlet temperature, ° C. | 280 | 288 |
| IV, dl/g | 0.61 | 0.61 |
| AA, ppm | 21 | 27 |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

The invention claimed is:

1. A method for the production of solid polyester polymer resin comprising:

a) esterifying the diacids and diols to form an oligomer mixture with a DP of less than 20; and b) polycondensing the oligomer mixture in the presence of a polycondensation catalyst composition comprising titanium species at a temperature of greater than 284° C. to an IV of about 0.4 dl/g; and c) completing the polycondensation by increasing the IV by at least 0.2 dl/g and cooling the polymer melt temperature to less than 282° C.; and d) solidifying and cutting the molten polyester polymer composition into solid polyester polymer particles; and optionally e) solid state polymerizing the solid polyester polymer particles to increase the IV by more than 0.05 dl/g.

2. The method of claim 1, wherein step a) esterifies the diester of the said diacids.

3. The method of claim 1, wherein the mole ratio of said diol to said diacid is less than about 1.15.

4. The method of claims 1 or 2, wherein the said diacids comprise at least 80 weight % of terephthalic acid or 2,6-naphthalene dicarboxylic acid.

5. The method of claim 4, wherein said diols comprise at least 80 weight % of ethylene glycol.

* * * * *